US010489163B2

(12) United States Patent
Holland et al.

(10) Patent No.: US 10,489,163 B2
(45) Date of Patent: Nov. 26, 2019

(54) LOADING A PROGRAM DURING BOOT OF A DEVICE

(71) Applicant: LENOVO Enterprise Solutions (Singapore) PTE. LTD., New Tech Park (SG)

(72) Inventors: Jeffrey S. Holland, Newton, NC (US); Shareef F. Alshinnawi, Apex, NC (US); Gary D. Cudak, Wake Forest, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 100 days.

(21) Appl. No.: 15/174,917

(22) Filed: Jun. 6, 2016

(65) Prior Publication Data

US 2017/0351527 A1    Dec. 7, 2017

(51) Int. Cl.
*G06F 9/44* (2018.01)
*G06F 9/4401* (2018.01)
*G06F 9/445* (2018.01)

(52) U.S. Cl.
CPC .............. *G06F 9/441* (2013.01); *G06F 9/445* (2013.01); *G06F 9/4406* (2013.01); *G06F 9/4411* (2013.01); *G06F 9/4416* (2013.01)

(58) Field of Classification Search
CPC .................. G06F 1/32; G06F 1/28; G06F 1/26
USPC ....... 713/300, 210, 320, 321, 322, 323, 324, 713/330, 345, 375
See application file for complete search history.

(56) References Cited

U.S. PATENT DOCUMENTS

| 2002/0138669 A1* | 9/2002 | Kadatch | G06F 1/3203 710/5 |
| 2006/0156209 A1* | 7/2006 | Matsuura | G06Q 10/10 714/798 |
| 2008/0070588 A1* | 3/2008 | Morin | H04W 4/02 455/456.1 |
| 2009/0164772 A1* | 6/2009 | Karkaria | G06F 9/445 713/100 |
| 2009/0271514 A1* | 10/2009 | Thomas | G06F 11/3438 709/224 |

(Continued)

OTHER PUBLICATIONS

Oracle, "Oracle Solaris Administration: Basic Administraction," Jun. 2013, http://docs.oracle.com/cd/E26505_01/html/E29492/getov.html, Last Visited Mar. 30, 2016, Last updated Oct. 1, 2013.

*Primary Examiner* — Jaweed A Abbaszadeh
*Assistant Examiner* — Keshab R Pandey
(74) *Attorney, Agent, or Firm* — Kunzler Bean & Adamson; Bruce R. Needham (57) ABSTRACT

An apparatus, method, and program product are disclosed for loading a program during boot of a device. A monitor module collects usage data for each of one or more programs executing on a device. The usage data for each program comprising an amount of time that the program was used and a schedule of when the program was used. A priority module assigns a boot priority to each of the one or more programs based on the amount of time that each program was used. A boot module selects one or more programs to load during a boot period for the device based on each program's usage schedule. The one or more selected programs are loaded according to each selected program's boot priority.

19 Claims, 5 Drawing Sheets

(56) References Cited

U.S. PATENT DOCUMENTS

| | | | |
|---|---|---|---|
| 2010/0127740 A1* | 5/2010 | Eto | G06F 1/3203 327/151 |
| 2013/0311762 A1* | 11/2013 | Bank | G06F 9/4401 713/2 |
| 2013/0311946 A1* | 11/2013 | Kwon | G06F 3/04817 715/811 |
| 2015/0212825 A1* | 7/2015 | Kim | G06F 9/4406 713/2 |

* cited by examiner

LOADING A PROGRAM DURING BOOT OF A DEVICE

FIELD OF THE INVENTION

The subject matter disclosed herein relates to loading programs during a boot period of a device, and more particularly relates to determining a boot priority and an order for programs selected to be loaded during boot of the device.

BACKGROUND

Devices take time to boot from a powered-off or suspend state to a functioning, stable state. Various programs may be loaded during boot of a device, including boot loaders, drivers, operating systems, services, applications, etc. However, there is a trade-off between the amount of time it takes for a device to boot and the number of programs that are loaded. Often a boot operation delays use of a computer while loading programs that are seldom used or will not be used at the time of boot-up.

BRIEF SUMMARY

An apparatus for loading a program during boot of a device is disclosed. A method and computer program product also perform the functions of the apparatus. In one embodiment, an apparatus includes a monitor module that collects usage data for each of one or more programs executing on a device. Usage data for each program includes an amount of time that the program was used and a schedule of when the program was used. The apparatus includes a priority module that assigns a boot priority to each of one or more programs based on an amount of time that each program was used. The apparatus includes a boot module that selects one or more programs to load during a boot period for a device based on each program's usage schedule. One or more selected programs may be loaded according to each selected program's boot priority.

In one embodiment, the apparatus includes a calendar module that makes calendar data associated with a device accessible to a boot module during a boot period. In some embodiments, the boot module further selects one or more programs to load during a boot period based on calendar data. In a further embodiment, each of one or more selected programs includes a current date and/or a current time determined from calendar data that coincides with a likely schedule of use for a program as determined by the monitor module.

In some embodiments, the boot module loads each of one or more selected programs that includes a current date or a current time coinciding with a likely schedule of use for a program in an order based on the boot priority. In various embodiments, the boot module predicts which of one or more programs to select to load during a boot period based on usage data for each program and a current state of a device. In certain embodiments, the amount of time a program was used includes an amount of time that the program executed on a device or an amount of time the program was actively used on the device.

In one embodiment, the boot module loads one or more selected programs that have boot priorities that satisfy a priority threshold during a boot period, and loads one or more selected programs that have boot priorities that do not satisfy the priority threshold subsequent to the boot period. In a further embodiment, the boot module loads one or more selected programs that have boot priorities that do not satisfy a priority threshold while a device is in an idle state subsequent to a boot period.

In one embodiment, the priority module overrides an assigned boot priority for a program based on user input specifying a different boot priority for the program. In some embodiments, the apparatus further includes a profile module that defines one or more boot profiles based on usage data and/or user input. A boot profile may include one or more programs to load during a boot period such that each of one or more selected programs are selected from the one or more programs of the boot profile.

In certain embodiments, the profile module associates a boot profile with a time period such that the boot module loads one or more programs of the boot profile in response to the time period associated with the boot profile corresponding to a time period during the boot of the device. In some embodiments, the apparatus further includes a shutdown module that exits one or more programs executing on the device prior to the device entering a suspend state. The boot module may determine whether one or more exited programs should be loaded in response to a device being resumed from a suspend state. In some embodiments, a boot period includes powering-on a device or resuming a device from a suspend state.

In one embodiment, a method includes collecting usage data for each of one or more programs executing on a device. Usage data for each program may include an amount of time that the program was used and a schedule of when the program was used. The method includes assigning a boot priority to each of one or more programs based on an amount of time that each program was used. The method includes selecting one or more programs to load during a boot period for a device based on each program's usage schedule. One or more selected programs may be loaded according to each selected program's boot priority.

In one embodiment, the method includes making calendar data associated with a device accessible during a boot period such that one or more programs are selected to load during the boot period based on the calendar data. In a further embodiment, each of the one or more selected programs includes a current date and/or a current time determined from the calendar data that coincides with a likely schedule of use for the program. In certain embodiments, each of the one or more selected programs that includes a current date or a current time coinciding with a likely schedule of use for the program is loaded in an order based on the boot priority.

In one embodiment, the method includes defining one or more boot profiles based on usage data and/or user input. The boot profile may include one or more programs to load during a boot period such that each of the one or more selected programs are selected from the one or more programs of the boot profile. In a further embodiment, the method includes associating the boot profile with a time period such that one or more programs of the boot profile are loaded in response to the time period associated with the boot profile corresponding to a time period during the boot of the device.

In one embodiment, a program product includes a computer readable storage medium that stores code executable by a processor. The executable code includes code to perform collecting usage data for each of one or more programs executing on a device. Usage data for each program includes an amount of time that the program was used and a schedule of when the program was used. The executable code includes code to perform assigning a boot priority to each of one or more programs based on an amount of time that each program was used. The executable code includes code to perform selecting one or more programs to load during a boot period for a device based on each program's usage schedule. One or more selected programs may be loaded according to each selected program's boot priority.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
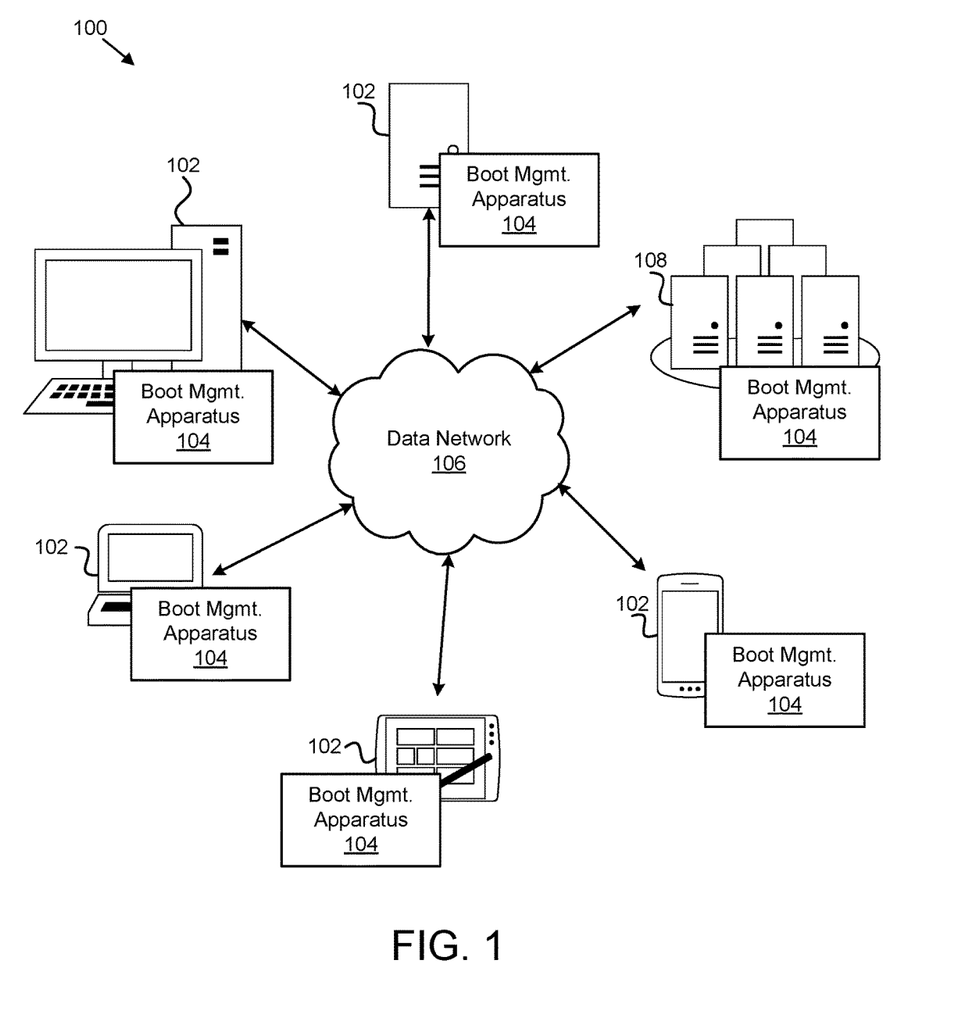
FIG. 1 is a schematic block diagram illustrating one embodiment of a system for loading a program during boot of a device.

FIG. 1 depicts one embodiment of a system 100 for loading a program during boot of a device. In one embodiment, the system 100 includes one or more information handling devices 102, one or more boot management apparatuses 104, one or more data networks 106, and one or more servers 108. In certain embodiments, even though a specific number of information handling devices 102, boot management apparatuses 104, data networks 106, and servers 108 are depicted in FIG. 1, one of skill in the art will recognize, in light of this disclosure, that any number of information handling devices 102, boot management apparatuses 104, data networks 106, and servers 108 may be included in the system 100.

In one embodiment, the system 100 includes one or more information handling devices 102. The information handling devices 102 may include a desktop computer, a laptop computer, a tablet computer, a smart phone, a set-top box, a gaming console, a smart TV, a smart watch, a fitness band, an optical head-mounted display (e.g., a virtual reality headset, smart glasses, or the like), an High-Definition Multimedia Interface ("HDMI") or other electronic display dongle, a personal digital assistant, or another computing device including a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupleable to one another and/or to one or more servers 108 over a data network 106, described below. The information handling devices 102, in a further embodiment, are capable of executing various firmware, programs, program code, applications, instructions, functions, and/or the like, and may access, store, download, upload, and/or the like data located on one or more servers 108. In some embodiments, the information handling devices 102 are configured to send and receive files from one or more different information handling devices 102, modify files, store files locally and/or in remote locations, and/or the like. The information handling devices 102 may include an electronic display, such as a touch screen display, that a user may interact with to load, execute, run, or the like applications, programs, scripts, services, or the like that are executable on an information handling device 102. A user, for example, may click, touch, select, or the like a graphical icon representing a program, run a command from a command line interface to execute a program, and/or the like.

In one embodiment, the boot management apparatus 104 determines an optimized, efficient, user-preferred, and/or the like order of loading programs at boot time based on usage histories of the programs. In some embodiments, the boot management apparatus 104 is configured to collect usage data for each of one or more programs executing on a device, while the programs execute. In certain embodiments, the usage data for each program may include an amount of time that the program was used, a schedule of when the program was used, and/or the like. In a further embodiment, the boot management apparatus 104 assigns a boot priority to each of the one or more programs based on an amount of time that each program was used. In various embodiments, the boot management apparatus 104 selects one or more programs to lead during a boot period for the device based on each program's usage schedule. The one or more selected programs may be loaded according to each selected program's boot priority.

The boot management apparatus 104, in one embodiment, improves the functioning of the computer and/or the computer technology in general, and improves the usability of the computer technology, by determining an efficient, optimized, user-preferred, and/or the like load order for programs loaded on the computer during a boot period, such as when the computer is powered-on from a powered-off state, a suspend state (e.g., sleep or hibernate), or the like. In this manner, the boot management apparatus 104 can determine which programs to load according to a program's usage history and a schedule of the program's usage.

For example, the boot management apparatus 104 may load productivity software (e.g., word processor program, spreadsheet program, development software, etc.) when a user boots his computer between 8:00 AM and 5:00 PM on a work day, and entertainment software (e.g., web browser, media player, gaming programs, etc.) when the user boots his computer after 5:00 PM on a work day based on a history of the user's use of the programs. This may decrease the boot time, and improve the user experience by proactively loading programs that a user frequently uses during certain time periods when the user's computer is booted.

In various embodiments, the boot management apparatus 104 may be embodied as a hardware appliance that can be installed or deployed on an information handling device 102, on a server 108, or elsewhere on the data network 106. In certain embodiments, an boot management apparatus 104 may include a hardware device such as a secure hardware dongle or other hardware appliance device (e.g., a set-top box, a network appliance, or the like) that attaches to a device, a laptop computer, a server 108, a tablet computer, a smart phone, or the like, either by a wired connection (e.g., a Universal Serial Bus ("USB") connection) or a wireless connection (e.g., Bluetooth®, Wi-Fi®, near-field communication ("NFC"), or the like); that attaches to an electronic display device (e.g., a television or monitor using an HDMI port, a DisplayPort port, a Mini DisplayPort port, Video Graphics Array ("VGA") port, Digital Visual Interface ("DVI") port, or the like); and/or the like. A hardware appliance of the boot management apparatus 104 may include a power interface, a wired and/or wireless network interface, a graphical interface that attaches to a display, and/or a semiconductor integrated circuit device as described below, configured to perform the functions described herein with regard to the boot management apparatus 104.

The boot management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the boot management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the boot management apparatus 104.

The semiconductor integrated circuit device or other hardware appliance of the boot management apparatus 104, in certain embodiments, includes and/or is communicatively coupled to one or more volatile memory media, which may include but is not limited to: random access memory ("RAM"), dynamic RAM ("DRAM"), cache, or the like. In one embodiment, the semiconductor integrated circuit device or other hardware appliance of the boot management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

While the boot management apparatus 104 is shown as part of each information handling device 102 and server 108 in the system 100 depicted in FIG. 1, the boot management apparatus 104 may be located, installed, or executed on one information handling device 102 or server 108, on a plurality of information handling devices 102 and servers 108, or the like. The boot management apparatus 104, in another embodiment, may be installed on a server 108 and distributed to one or more information handling devices 102 such that portions of the boot management apparatus 104 are located, installed, or executed on a plurality of information handling devices 102 and/or servers 108.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The one or more servers 108, in one embodiment, may be embodied as blade servers, mainframe servers, tower servers, rack servers, and/or the like. The one or more servers 108 may be configured as a mail server, a web server, an application server, an FTP server, a media server, a data server, a web server, a file server, a virtual server, and/or the like. In certain embodiments, the one or more servers 108 store files such as text documents, spreadsheets, portable document format ("PDF") files, emails, audio files, video files, source code, and/or the like, which may be accessed by the boot management apparatus 104. The one or more servers 108 may store programs, applications, scripts, program code, or the like that is accessible by and executable on an information handling device 102. In some embodiments, the one or more servers 108 may be located on an organization's premises, in a data center, in the cloud, and/or the like. The one or more servers 108 may be accessed remotely over a data network 106 like the Internet, or locally over a data network 106 like an intranet.

Figure 2:
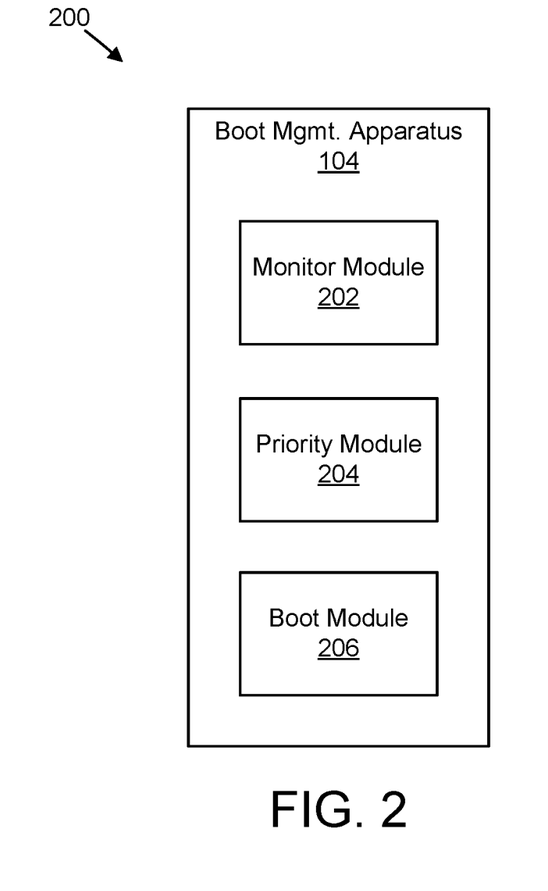
FIG. 2 is a schematic block diagram illustrating one embodiment of an apparatus for loading a program during boot of a device.

FIG. 2 depicts one embodiment of an apparatus 200 for loading a program during boot of a device. The apparatus 200 may include an embodiment of a boot management apparatus 104. In one embodiment, the boot management apparatus 104 includes a monitor module 202, a priority module 204, and a boot module 206, which are described in more detail below.

The monitor module 202, in one embodiment, is configured to collect usage data for each of one or more programs executing on a device. As described above, a program executable on the device may include antivirus programs, firewalls, desktop managers, productivity applications, multimedia applications, development applications, services, operating system programs, and/or the like. The monitor module 202, in some embodiments, collects, tracks, stores, or the like usage data for programs while they execute on a device. The monitor module 202, for example, may use an existing monitoring program, such as an operating system task monitor, to track a program's usage.

In some embodiments, the usage data includes an amount of time that a program is used. In one embodiment, the amount of time that a program is used is an amount of time that the program is executing on the device. In a further embodiment, the amount of time that a program is used is an amount of time that the program is actively used, e.g., an amount of time that a user interacts with or uses the program, an amount of time that the program is actively processing data and not in an idle state, or the like.

In certain embodiments, the usage data includes a schedule of when a program is used. For example, the usage data for a word processing application may include data that shows that the application is typically executed on Monday through Friday, and between the hours of 8:00 AM and 5:00 PM. Similarly, the usage data for a video program may include data that shows that the video program is typically used on Friday and Saturday evenings after 8:00 PM. The monitor module 202 may track a program's usage schedule for a month, multiple months, weeks, days, hours, or the like depending on the desired granularity of the data.

In a further embodiment, the usage data includes location data associated with a program's use. The location data may include global positioning system ("GPS") data, map data, address data, or the like. For example, the monitor module 202 may associate a word processing program's usage with a device's location, such as at an office. The usage data, for example, may show that a word processing program was used at a location of a user's office Monday through Friday between 8:00 AM and 5:00 PM. In another example, the monitor module 202 may associate a web browser's usage with a device's location, such as at home, in an office, at school, or the like. The usage data, for example, may show that the web browser was used at a location of a user's home Monday through Sunday between 8:00 PM and midnight.

In one embodiment, the priority module 204 assigns a boot priority to each program executing on a device based on the amount of time that each program is used. The priority module 204, in certain embodiments, assigns boot priorities in descending order according to the programs that are executed on the device. For example, if a word processor is executed on the device every work day for eight hours a day, as determined based on the usage data, it may receive a higher boot priority than a web browser that is executed every evening for three hours. The priorities may be a rank value such as a numerical or other ranking value, or the like. The priorities may be weighted to account for programs that may be more important than other programs, such as antivirus or firewall programs, which may be defined by the system or a user.

In some embodiments, the priority module 204 assigns boot priorities to programs for a predefined block of time. As described in more detail below with reference to the profile module 304, the priority module 204 may assign boot priorities to programs for a "work" block of time defined as a period of time on Monday through Friday between 8:00 AM and 5:00 PM. Similarly, the priority module 204 may assign boot priorities to programs for an "evening" block of time defined as a period of time on Monday through Friday from 5:00 PM to 8:00 AM, a "weekend" block of time for Saturday and Sunday between 8:00 AM Saturday to 8:00 AM Monday, or the like. The priority module 204 may also account for holidays or other calendar events, as determined by the calendar module 302. For example, if a holiday falls on a Monday, the "weekend" block of time may extend to Monday.

In some embodiments, the priority module 204 overrides a boot priority assigned to a program based on input received from a user. For example, a user may want a web browser to always be loaded first, based on its usage schedule data, when the device is booted, and may assign the highest boot priority to the web browser program so that the boot module 206, below, always loads the web browser according to its usage schedule data regardless the boot priority that the priority module 204 assigns to it.

In one embodiment, the boot module 206 is configured to select one or more programs to load during a boot period for the device. As used herein, the boot period for a device is a period of time during which the device is booted from a powered-off state to a powered-on state, or is resumed from a suspend state (e.g., a sleep or hibernate state) to a powered-on state. The boot period may be the period of time from receiving a signal to power-on to when the operation system is loaded and reaches a stable state, or in another embodiment, a state where a user may execute commands without significant delay caused by booting activity.

The boot module 206, in one embodiment, selects one or more programs to load based on each program's usage schedule, which is included in the program's usage data. A program's usage schedule may show what days and/or times a program is executed. For example, a spreadsheet program may generally be executed Monday through Friday between 8:00 AM and 5:00 PM, and a game application may be executed Monday through Friday between 8:00 PM and 10:00 PM and Saturdays between 7:00 PM and midnight.

Based on the usage schedule data for each program, the boot module 206 selects one or more programs to load when the device is booted. For example, when a device is booted on a Wednesday morning at 8:00 AM, the boot module 206 may determine that a word processing application, a web browser, and a spreadsheet application are typically executed at this time, based on the usage schedule data. After the boot module 206 selects the programs to load, the boot module 206 checks the boot priorities for each program and loads the programs in order of each program's boot priority. Continuing with the previous example, if the word processing program has a boot priority of "1," the spreadsheet program has a boot priority of "2," and the web browser has a boot priority of "3," the boot module 206 may load the word processing program first, and then the spreadsheet program, and finally the web browser program.

In some embodiments, the boot module 206 predicts program usage trends, patterns, or the like based on the programs usage data. For example, if the usage data for a photo editing program shows that it is typically used on Mondays and Wednesdays from 9:00 AM to 11:00 AM, the boot module 206 may anticipate that the photo editing program should be loaded when the device is booted on Mondays and Wednesdays between 9:00 AM and 11:00 AM hours. However, if the usage data for the photo editing program shows that it was executed on a single Saturday from 5:00 PM to 6:00 PM and on a single Sunday from 1:00 PM to 3:30 PM in the previous two months, the boot module 206 may not select it as a program to load when the device is booted during those days/times. Accordingly, in such an embodiment, the boot module 206 may discard outlier usage schedule data, or usage schedule data that does not confirm that a program is regularly executed at a particular day/time. In one embodiment, the boot module 206 may determine whether the number of times that a program is executed on a particular day/time satisfies a predefined threshold to determine whether the usage schedule data is outlier data.

In one embodiment, the boot module 206 loads one or more programs that have boot priorities that satisfy a predefined priority threshold before loading one or more programs that do not satisfy the priority threshold. For example, if the predefined priority threshold is a "3," the boot module 206 may load all of the selected programs that have a boot priority greater than or equal to "3" (e.g., programs that have a boot priority of "1," "2," or "3,") before loading programs with lesser boot priorities. The boot module 206, in some embodiments, loads the programs with boot priorities that do not satisfy the priority threshold subsequent to the boot period, such as after the operating system reaches a stable state, a usable state where delays are at a minimum due to booting, when the system is in an idle state, and/or the like.

In various embodiments, the boot module 206 loads one or more selected programs prior to the operating system being booted (e.g., malware detection software), during boot of the operating system (e.g., antivirus or firewall software), and/or after the operating system has been loaded. Similarly, if the device is being awakened from a sleep or hibernate state, the boot module 206 may load the selected programs while the operating system loads, after the operating system reaches a stable state, etc.

Figure 3:
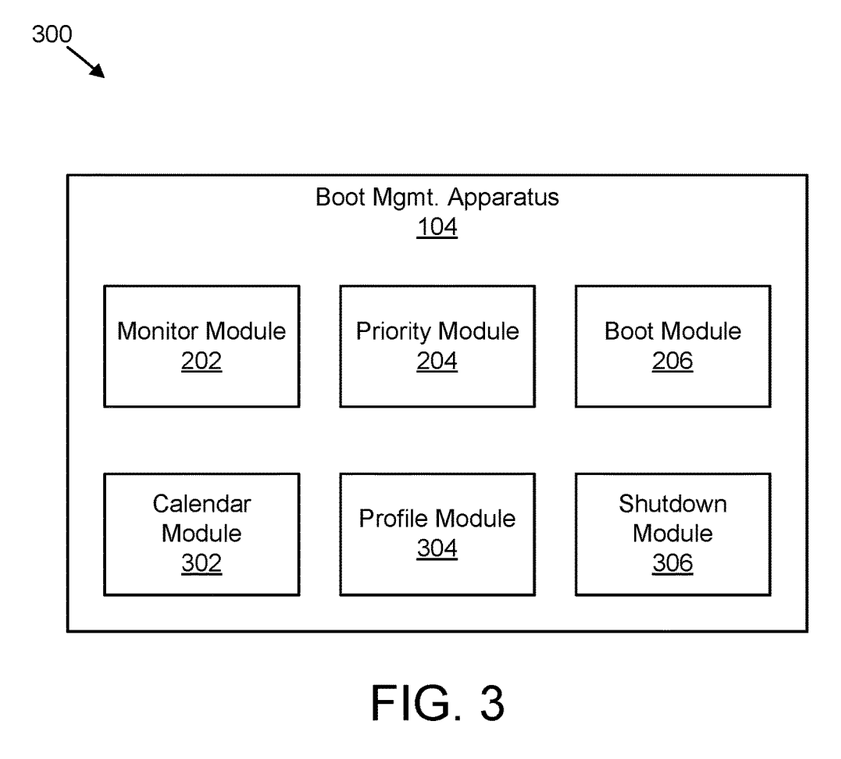
FIG. 3 is a schematic block diagram illustrating one embodiment of another apparatus for loading a program during boot of a device.

FIG. 3 depicts one embodiment of an apparatus 300 for loading a program during boot of a device. The apparatus 300 may include an embodiment of a boot management apparatus 104. In one embodiment, the boot management apparatus 104 includes a monitor module 202, a priority module 204, and a boot module 206, which may be substantially similar to the monitor module 202, the priority module 204, and the boot module 206 described above with reference to FIG. 2. Furthermore, the boot management apparatus 104, in some embodiments, includes a calendar module 302, a profile module 304, and/or a shutdown module 306, which are described in more detail below.

The calendar module 302, in one embodiment, makes calendar data associated with a user and/or device accessible to the boot module 206 during the boot period. As used herein, calendar data may include date and time information and may include events, holidays, reminders, to-do items, or the like, that may be associated with a calendar or schedule on a user's device. For example, calendar data may include one or more scheduled meetings for a user. The calendar module 302 may receive calendar data from a program that stores calendar data, such as Microsoft Outlook®, from a web service, such as Gmail®, or the like. In another embodiment, the calendar module 302 receives calendar data in the form of date and time information. In certain embodiments, the calendar module 302 stores the calendar data in a file, folder, or other location that is accessible to the boot module 206 during the boot period.

The boot module 206, in one embodiment, further selects one or more programs to load during the boot period based on the calendar data. For example, if a presentation program such as Microsoft PowerPoint® is not typically loaded at 11:00 AM on a Tuesday, but the boot module 206 determines that a user has a meeting scheduled at 11:00 AM on Tuesday, and that the user is presenting at the meeting, based on the details of the event on the calendar data, the boot module 206 may load the presentation program when the user boots or resumes his computer from a suspend state before the meeting.

In certain embodiments, each of the one or more programs comprises, includes, stores with metadata, or is otherwise associated with a current date, a current time, a period of time, a block of time, and/or the like as determined from the calendar data that coincides with a likely schedule of use for each program as determined by the monitor module 202. For example, if the current data and time indicated by the calendar data is Monday at 9:00 AM, and the usage data indicates that it is likely that a word processing program, a spreadsheet program, and a web browser program are typically executed on Mondays at 9:00 AM, then the boot module 206 may select these programs to load during the boot period, and may load the selected programs in an order based on the boot priorities assigned to each program.

On the other hand, if the calendar data indicates that it is Monday at 9:00 AM, and the usage data indicates that a presentation program has been executed once in the past four weeks on Monday at 9:00 AM, the boot module 206 may bypass loading the presentation program because it is likely that the execution of the presentation program is an outlier, e.g., the presentation program was executed once for a monthly meeting, presentation, or the like. In this manner, the boot management apparatus 104 can distinguish from programs that are occasionally executed, and programs that are executed on a regular basis, as described above. In such an embodiment, the boot module 206 may select programs to load if the programs have been executed more than a threshold number of times within a threshold time period. For example, the boot module 206 may load a music player during a boot period if the music player has been executed more than four times in the last two weeks. Otherwise, the boot module 206 may bypass loading the music player, regardless of the boot priority assigned to the music player.

In one embodiment, the profile module 304 is configured to define one or more boot profiles based on usage data, user input, or the like. As used herein, a boot profile includes one or more programs that should be loaded during the boot period. The boot module 206, in certain embodiments, selects one or more programs to load during the boot period from the programs included in the boot profile.

For example, the profile module 304 may create a "work" boot profile that specifies that a word processing program, a spreadsheet program, a web browser, and an email program should be loaded when a device is booted on Monday through Friday between 8:00 AM and 5:00 PM. Similarly, the profile module 304 may create an "entertainment" boot profile that specifies that a gaming application, a web browser, and a music program should be loaded when a device is booted any evening after 7:00 PM.

In certain embodiments, the profile module 304 uses the usage data for each program to determine when the program is used and other programs that are used during the same time to create a boot profile for a particular time period or block of time. In one embodiment, the profile module 304 receives input from a user specifying a custom boot profile that includes programs selected by the user to load during a particular period of time. In some embodiments, the profile module 304 provides means for the user to specify during boot time which boot profile to load, if any, using an operating system setting, a boot-loader setting, or the like.

The shutdown module 306, in one embodiment, is configured to exit one or more programs executing on a device prior to the device entering a suspend state, e.g., a sleep or hibernate state. For example, when conventional systems are placed in a suspend state, states of the programs that are executing are saved so that when the system is resumed, the same programs that were executing prior to entering the suspend state may be resumed to the same state they were in prior to entering the suspend state.

Unlike conventional systems, however, the shutdown module 306 exits or closes each program that is executing prior to entering a suspend state. In such an embodiment, the shutdown module 306 saves data for each program prior to exiting the program so that no data is lost. Furthermore, because the program is exited or closed prior to entering the suspend state, the boot module 206 is not required to resume executing the exited programs when the device is resumed from the suspend state. Instead, the boot module 206, as described above, selects one or more programs to execute during the boot period, e.g., the resume state, based on the usage data of the programs, and not necessarily based on which programs were executing prior to entering the suspend state.

In one example embodiment, a user, Bob, may use a single laptop for his work and personal usage. Bob may use his laptop at home, for example, to play video games, listen to music, and browse the web. When Bob is done, he may simply close the lid of the laptop without closing the programs he was using, which places the laptop in a suspend state (e.g., sleep or hibernate). Because Bob stays up late, he may be late for an early morning meeting where he is a presenter. The boot management apparatus 104 disclosed herein may save Bob time and privacy by automatically closing the programs he was using the prior evening when he closed the laptop lid so that they do not automatically resume when his laptop is resumed from its suspend state, and automatically load his presentation software that he will use for the meeting when the laptop is resumed from its suspend state.

Figure 4:
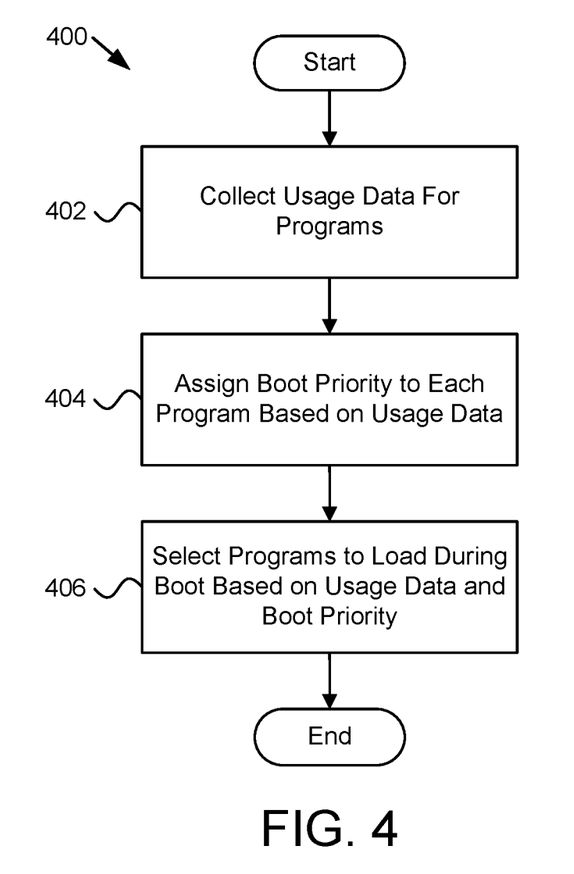
FIG. 4 is a schematic flow chart diagram illustrating one embodiment of a method for loading a program during boot of a device.

FIG. 4 is a schematic flow chart diagram illustrating one embodiment of a method 400 for loading a program during boot of a device. In one embodiment, the method 400 begins and collects 402 usage data for each of one or more programs executing on a device. In a further embodiment, the method 400 assigns 404 a boot priority to each of the one or more programs based on the amount of time that each program was used according to the usage data. In some embodiments, the method 400 selects 406 one or more programs to load during a boot period for the device based on each program's usage schedule. Accordingly, the one or more selected programs are loaded based on each selected program's boot priority, and the method 400 ends. In some embodiments, the steps of the method 400 are performed by the monitor module 202, the priority module 204, and/or the boot module 206.

Figure 5:
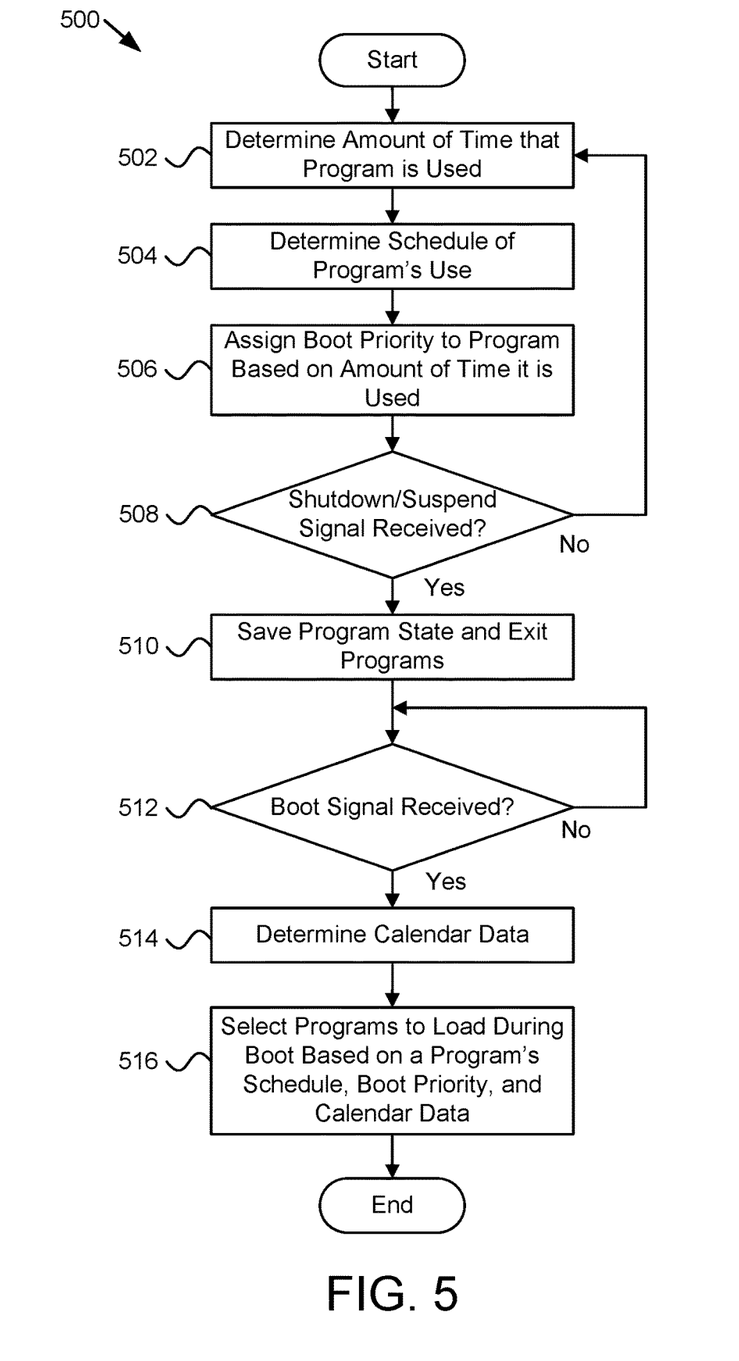
FIG. 5 is a schematic flow chart diagram illustrating one embodiment of another method for loading a program during boot of a device.

FIG. 5 is a schematic flow chart diagram illustrating one embodiment of a method 500 for loading a program during boot of a device. In one embodiment, the method 500 begins and determines 502 an amount of time that each program that is executing on a device is used. The amount of time that a program is used may be an overall amount of time that the program is executed, an amount of time that a user interacts with a program, an amount of time that the program is not in an idle state, or the like.

The method 500, in a further embodiment, determines 504 a schedule for when the program was used. For example, the method 500 may determine that a word processing program is used Monday through Friday between 8:00 AM and 5:00 PM. In some embodiments, the method 500 assigns 506 boot priorities to each program based the amount of time that each program is used.

In certain embodiments, the method 500 determines 508 whether a shutdown or suspend signal is received. If not, the method 500, in some embodiments, continues to determine 502 the amount of time that each program is used, determine 504 each program's schedule based on each program's use, and assign 506 boot priorities to each program. If the method 500 determines 508 that a suspend/shutdown signal was received, the method 500, in one embodiment, saves 510 the program state for each program executing on the device and exits or closes the programs.

In some embodiments, the method 500 determines 512 whether a boot signal is a received. If the method 500, in one embodiment, determines 512 that a boot signal was not received, the method 500 continues to monitor for boot signals. Otherwise, if the method 500 determines 512 that a boot signal is received, the method 500, in certain embodiments, determines 514 calendar data associated with each program executable on the device. Based on each program's usage schedule, boot priority, and calendar data, the method 500, in some embodiments, selects 516 which programs to load during the device's boot period, and loads the programs in order of their respective boot priorities, and the method 500 ends. In one embodiment, the monitor module 202, the priority module 204, the boot module 206, the calendar module 302, and the shutdown module 306 perform one or more steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  a monitor module that collects usage data for each of one or more programs executing on a device, the usage data for each program comprising an amount of time that the program is actively used, a schedule comprising the times and days that the program is used, a number of times that the program is executed within a threshold time period, and location data indicating a location where the program is used;

a priority module that assigns a boot priority to each of the one or more programs based on the amount of time that each program is used, wherein the one or more programs are loaded in order based on each program's boot priority; and a boot module that selects which of one or more programs to load during a boot period for the device, the one or more programs selected, regardless the boot priority assigned to each of the one or more programs, in response to:
- a current time and day corresponding with the program's usage schedule;
- the number of times that the program is executed within the threshold time period satisfying a threshold number; and
- the device's current location corresponding with the location data associated with the program, wherein said modules comprise one or more of hardware circuits, a programmable hardware device, and a processor executing code.

2. The apparatus of claim 1, further comprising a calendar module that makes calendar data associated with the device accessible to the boot module during the boot period, wherein the boot module further selects one or more programs to load during the boot period based on the calendar data.

3. The apparatus of claim 2, wherein each of the one or more selected programs comprises one or more of a current date and a current time determined from the calendar data that coincides with a likely schedule of use for the program as determined by the monitor module.

4. The apparatus of claim 3, wherein the boot module loads each of the one or more selected programs that comprises the current date or the current time coinciding with the likely schedule of use for the program in an order based on the boot priority.

5. The apparatus of claim 1, wherein the boot module predicts which of the one or more programs to select to load during the boot period based on the usage data for each program and a current state of the device.

6. The apparatus of claim 1, wherein the amount of time the program was used comprises one of an amount of time that the program executed on the device and an amount of time the program was actively used on the device.

7. The apparatus of claim 1, wherein the boot module loads one or more selected programs that have boot priorities that satisfy a priority threshold during the boot period, and loads one or more selected programs that have boot priorities that do not satisfy the priority threshold subsequent to the boot period.

8. The apparatus of claim 7, wherein the boot module loads the one or more selected programs that have boot priorities that do not satisfy the priority threshold while the device is in an idle state subsequent to the boot period.

9. The apparatus of claim 1, wherein the priority module overrides an assigned boot priority for a program based on user input, the user input specifying a different boot priority for the program.

10. The apparatus of claim 1, further comprising a profile module that defines one or more boot profiles based on one or more of the usage data and user input, a boot profile comprising one or more programs to load during the boot period, wherein each of the one or more selected programs are selected from the one or more programs of the boot profile.

11. The apparatus of claim 10, wherein the profile module associates a boot profile with a time period, the boot module loading the one or more programs of a boot profile in response to the time period associated with the boot profile corresponding to a time period during the boot of the device.

12. The apparatus of claim 1, wherein the boot period comprises one of powering-on the device and resuming the device from a suspend state.

13. An apparatus comprising:

a monitor module that collects usage data for each of one or more programs executing on a device, the usage data for each program comprising an amount of time that the program is actively used, a schedule comprising the times and days that the program is used, a number of times that the program is executed within a threshold time period, and location data indicating a location where the program is used;

a priority module that assigns a boot priority to each of the one or more programs based on the amount of time that each program is used, wherein the one or more programs are loaded in order based on each program's boot priority; and a boot module that selects which of one or more programs to load during a boot period for the device, the one or more programs selected, regardless the boot priority assigned to each of the one or more programs, in response to:
- a current time and day corresponding with the program's usage schedule;
- the number of times that the program is executed within the threshold time period satisfying a threshold number; and
- the device's current location corresponding with the location data associated with the program, wherein said modules comprise one or more of hardware circuits, a programmable hardware device, and a processor executing code.

14. The method of claim 13, further comprising making calendar data associated with the device accessible during the boot period, wherein the one or more programs are selected to load during the boot period based on the calendar data.

15. The method of claim 14, wherein each of the one or more selected programs comprises one or more of a current date and a current time determined from the calendar data that coincides with a likely schedule of use for the program.

16. The method of claim 15, wherein each of the one or more selected programs that comprises the current date or the current time coinciding with the likely schedule of use for the program is loaded in an order based on the boot priority.

17. The method of claim 13, further comprising defining one or more boot profiles based on one or more of the usage data and user input, a boot profile comprising one or more programs to load during the boot period, wherein each of the one or more selected programs are selected from the one or more programs of the boot profile.

18. The method of claim 17, further comprising associating a boot profile with a time period, wherein the one or more programs of a boot profile are loaded in response to the time period associated with the boot profile corresponding to a time period during the boot of the device.

19. A program product comprising a computer readable storage medium that stores code executable by a processor, the executable code comprising code to perform:
- collecting usage data for each of one or more programs executing on a device, the usage data for each program comprising an amount of time that the program is actively used, a schedule comprising the times and days that the program is used, a number of times that the program is executed within a threshold time period, and location data indicating a location where the program is used;
- assigning a boot priority to each of the one or more programs based on the amount of time that each program is used, wherein the one or more programs are loaded in order based on each program's boot priority; and
- selecting which of one or more programs to load during a boot period for the device, the one or more programs selected, regardless the boot priority assigned to each of the one or more programs, in response to:
  - a current time and day corresponding with the program's usage schedule;
  - the number of times that the program is executed within the threshold time period satisfying a threshold number; and
  - the device's current location corresponding with the location data associated with the program.

* * * * *